United States Patent [19]

Chauvin et al.

[11] Patent Number: 5,519,742
[45] Date of Patent: May 21, 1996

[54] PROCESS FOR REPLACING A WORN STEAM GENERATOR OF A PRESSURIZED WATER NUCLEAR REACTOR

[75] Inventors: Yves Chauvin; Didier Royet, both of Chalon-sur-Saone; Jean-Michel Chanussot, Santenay; Didier DiGiacomo, Le Rove; Jean-Charles Perfumo; Olivier Jurion, both of Marseille, all of France

[73] Assignees: Framatome, Coubevoie; Electricite' de France, Paris, both of France

[21] Appl. No.: 428,858

[22] Filed: Apr. 25, 1995

[30] Foreign Application Priority Data

Apr. 26, 1994 [FR] France .................................. 94 05032

[51] Int. Cl.⁶ ............................................ G21C 21/00
[52] U.S. Cl. .............................. 376/260; 29/890.031
[58] Field of Search ................................. 376/260, 258, 376/461; 29/402.08, 890.031; 165/76; 122/DIG. 11; 432/3

[56] References Cited

U.S. PATENT DOCUMENTS

| | | | |
|---|---|---|---|
| 4,847,038 | 7/1989 | Martin | 376/260 |
| 4,905,630 | 3/1990 | Weber | 122/DIG. 11 |
| 4,994,230 | 2/1991 | Cepkaukas | 376/260 |
| 5,379,331 | 1/1995 | Brouttelande | 376/461 |

FOREIGN PATENT DOCUMENTS

| | | |
|---|---|---|
| 289388 | 11/1988 | European Pat. Off. . |
| 564323 | 10/1993 | European Pat. Off. . |
| 3049081 | 9/1981 | Germany . |
| 3742876 | 6/1989 | Germany . |

OTHER PUBLICATIONS

"Steam Generator Replacement at Doel-3", Nuclear News, No. 14, Nov. 1993, pp. 34-36.

*Primary Examiner*—Daniel D. Wasil
*Attorney, Agent, or Firm*—Pollock, Vande Sande & Priddy

[57] ABSTRACT

The process comprises separating the worn steam generator from the primary circuit of the reactor by cutting pipes of the primary circuit, extracting the worn steam generator from the reactor and placing in position in the reactor a new replacement steam generator (21) and connecting by welding the lower part (21a) of the replacement steam generator (21) to the pipes (23, 25) of the primary circuit. The process further comprises welding to at least one of the nozzles (24a, 24b) of the lower part (21a) of the replacement steam generator (21) at least one elbow (26, 27) for connection to a pipe (23, 25) of the primary circuit prior to the introduction and the positioning of the replacement steam generator (21) in the reactor.

11 Claims, 5 Drawing Sheets

PROCESS FOR REPLACING A WORN STEAM GENERATOR OF A PRESSURIZED WATER NUCLEAR REACTOR

FIELD OF THE INVENTION

The invention relates to a process for replacing a worn steam generator of a pressurized water nuclear reactor.

BACKGROUND OF THE INVENTION

Pressurized water nuclear reactors comprise, inside a reactor building, a vessel enclosing the core of the reactor filled with pressurized water and a primary circuit constituted by a plurality of loops in communication with the core. Each of the loops of the primary circuit comprises a steam generator in which the pressurized water is cooled by heating and vaporizing feed water. Steam generators are disposed in shielded compartments arranged inside the reactor building.

The steam generators of each of the loops are connected to the vessel by inlet and outlet pipes for pressurized water under termed primary pipes. These pipes are connected to the water box in the lower part of the steam generator by elbows and nozzles constructed upon the forming of the water box of the steam generator. These connecting elbows are welded by one of their ends to the end of the primary pipe and by their second end to the nozzle for connection to the water box of the steam generator.

After a certain period of operation, the steam generators, which enclose a bundle of thermal exchange tubes ensuring the separation between the primary water and the feed water, must be inspected and, if some of the tubes of the bundle present leak, these tubes must be closed by a plug or sleeved to avoid contamination of the feed water.

When the steam generator has been in operation for a long period, it may be necessary to replace some or all of the tubes of the bundle. Since plugging of an excessive number of tubes of the bundle of the steam generator may result in an unacceptable reduction in the thermal performances of the steam generator and sleeving of the tubes can only be carried out in certain zones inside or in the vicinity of the tube plate of the steam generator.

A tube replacement operation is complex and it has appeared preferable, in certain cases, to completely replace the steam generators of pressurized water nuclear reactors. This replacement operation requires cutting off the primary pipes in the vicinity of the connection nozzles of the worn steam generator and welding the nozzles of the new replacement steam generator to the primary pipes awaiting reconnection.

FR-A-2,614,462 discloses a process for completely replacing a steam generator of a pressurized water nuclear reactor which permits, by means of topometric measurements carried out on the new replacement generators and on the elements fixing and connecting the worn steam generators inside the shielded compartments, optimizing the operations for the cutting of the primary pipes and the connection of the steam generators.

By using the process disclosed in FR-A-2,614,462, it was possible to carry out the replacement operations on a worn steam generator in nuclear power stations under perfectly optimized conditions as concerns the duration of the time required to carry out all of the operations necessary for changing a steam generator, the quality of these operations and limitation of the irradiation doses received by the personnel employed for the replacement operations.

In particular, such a replacement operation on the steam generators of a pressurized water nuclear reactor was carried out in a perfectly satisfactory workshop manner in the first half of 1990 at the Dampierre nuclear power station, at Bugy in 1993 and at Gravelines in 1994.

However, the steam generator replacement operations are generally carried out by connecting the nozzles of the new steam generator to the ends of the elbows placed at the ends of the primary pipes awaiting reconnection, so that the elbows of the primary circuit are generally not replaced at the same time as the steam generator.

Certain-check ups and inspections have shown that the elbows connecting the water box of the steam generator to the primary circuit undergo in service deteriorations which require their replacement. Of course, owing to the complexity of these replacement operations, which require cutting the pipes of the primary circuit, it is much easier to replace the elbows at the same time as the steam generator.

To replace an elbow at the same time as a steam generator, it is necessary to cut the primary pipe at each of the ends of the elbow and to fix the replacement elbow in a position interposed between the end of the primary pipe awaiting reconnection and a nozzle of the steam generator. This replacement operation for an elbow, generally designated "closer", is very complex; in particular, the handling of the elbow up to the butt joint position requires the development of tooling complicated to use when the steam generator is in position. The welding operation is all the more delicate as it must be carried out inside the shielded compartment of the steam generator, at each of the ends of the elbow and at the same time as the welding of the second primary pipe of the steam generator.

The operation is even more complex when it is necessary to replace both elbows connecting the steam generator to the primary circuit.

While it was possible to replace a steam generator by making only two cuts in the primary circuit, the replacement of a steam generator at the same time as the replacement of one or both elbows requires making three or four cuts, and the same number of connections by welding.

SUMMARY OF THE INVENTION

An object of the invention is therefore to provide a process for replacing a worn steam generator of a pressurized water nuclear reactor which comprises a reactor building defining a compartment in which the steam generator is mounted and a primary circuit for cooling the reactor with pressurized water comprising two pipes each connected to the lower part of the steam generator by means of a nozzle connected to the lower part of the steam generator and an elbow welded at one of its ends to the nozzle and at its other end to the pipe. The process comprises separating the worn steam generator from the primary circuit by cutting the pipes of the primary circuit, extracting the worn steam generator from the compartment, positioning a new replacement generator in the compartment and connecting the lower part of the replacement steam generator to the pipes of the primary circuit by welding. This process permitting simultaneous replacement of the steam generator and one or both of the elbows connecting this steam generator to the primary circuit.

To this end, the process comprises welding to at least one of the nozzles of the lower part of the new replacement steam generator at least one elbow for connection to a pipe of the primary circuit, prior to the introduction and the positioning of the new replacement steam generator in the compartment.

BRIEF DESCRIPTION OF THE DRAWINGS

For the purpose of explaining the invention there will now be described, by way of example and with reference to the accompanying drawings, manners of carrying out the process according to the invention.

FIG. 6 is a perspective view of the lower part of a steam generator in position for connection to the pipes of the primary circuit of a nuclear reactor when carrying out a third embodiment the process according to the invention in.

DETAILED DESCRIPTION

Figure 1:
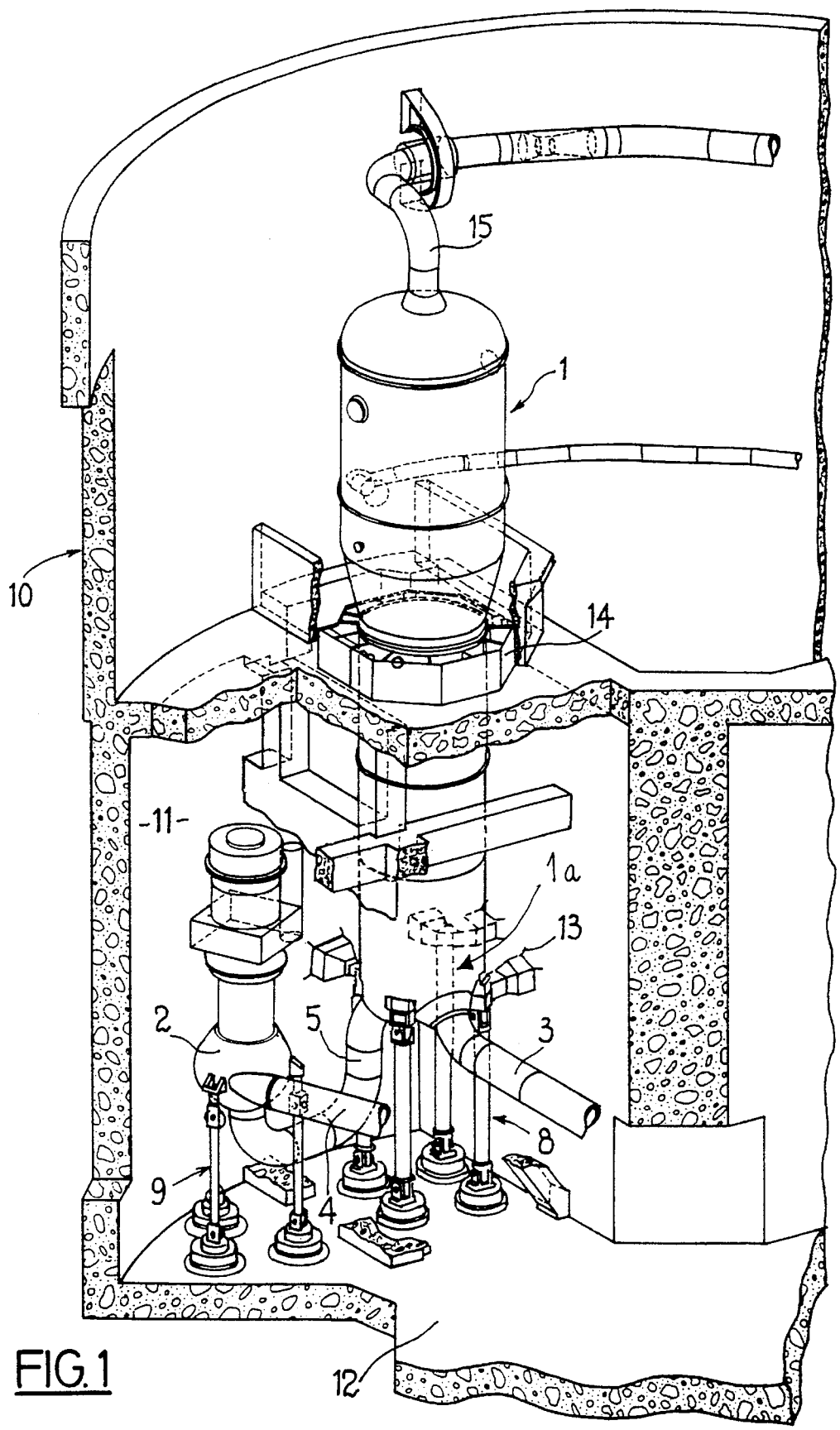
FIG. 1 is an exploded perspective view of a steam generator of a pressurized water nuclear reactor in position in a shielded compartment of the building of the reactor.

FIG. 1 shows a part of a loop of the primary circuit of a pressurized water nuclear reactor comprising a steam generator 1, a primary pump 2, primary pipes 3 and 4 for connecting the vessel of the reactor to the steam generator and to the primary pump, respectively, and a pipe 5 for connecting the steam generator 1 to the primary pump 2. The primary pipes 3 and 5 are connected to the lower part 1a of the steam generator, which constitutes the water box of the latter.

The pressurized cooling water of the reactor is put into circulation in the loop by the primary pump 2. The water heated upon contact with the core in the vessel of the reactor reaches the water box 1a of the steam generator through the primary pipe 3, termed hot leg. The water then circulates in the tubes of the steam generator, where it cools by heating and vaporizing the feed water. The cooled water then returns to the outlet part of the water box 1a and is then returned to the vessel of the reactor through the pipes 5 and 4, the pipe 4 constituting the cold leg. The pipe 5 which provides the connection between the steam generator 1 and the primary pump 2 has a U-shape and is for this reason termed a U-leg. The steam generator 1 and the primary pump 2 are arranged with their axes vertical and rest on articulated prop units 8 and 9, respectively.

A part of the reactor building 10 which encloses the vessel and all of the primary circuit of the reactor is shown in FIG. 1; it is constituted by a shielded compartment 11 which receives the steam generator 1. The steam generator rests on the floor 12 of the shielded compartment 11 through articulated props 8. The steam generator is centered and positioned in the shielded compartment 11 in the region of girdles 13 and 14.

The upper part of the shell of the steam generator is connected to a steam discharge pipe 15.

Figure 2:
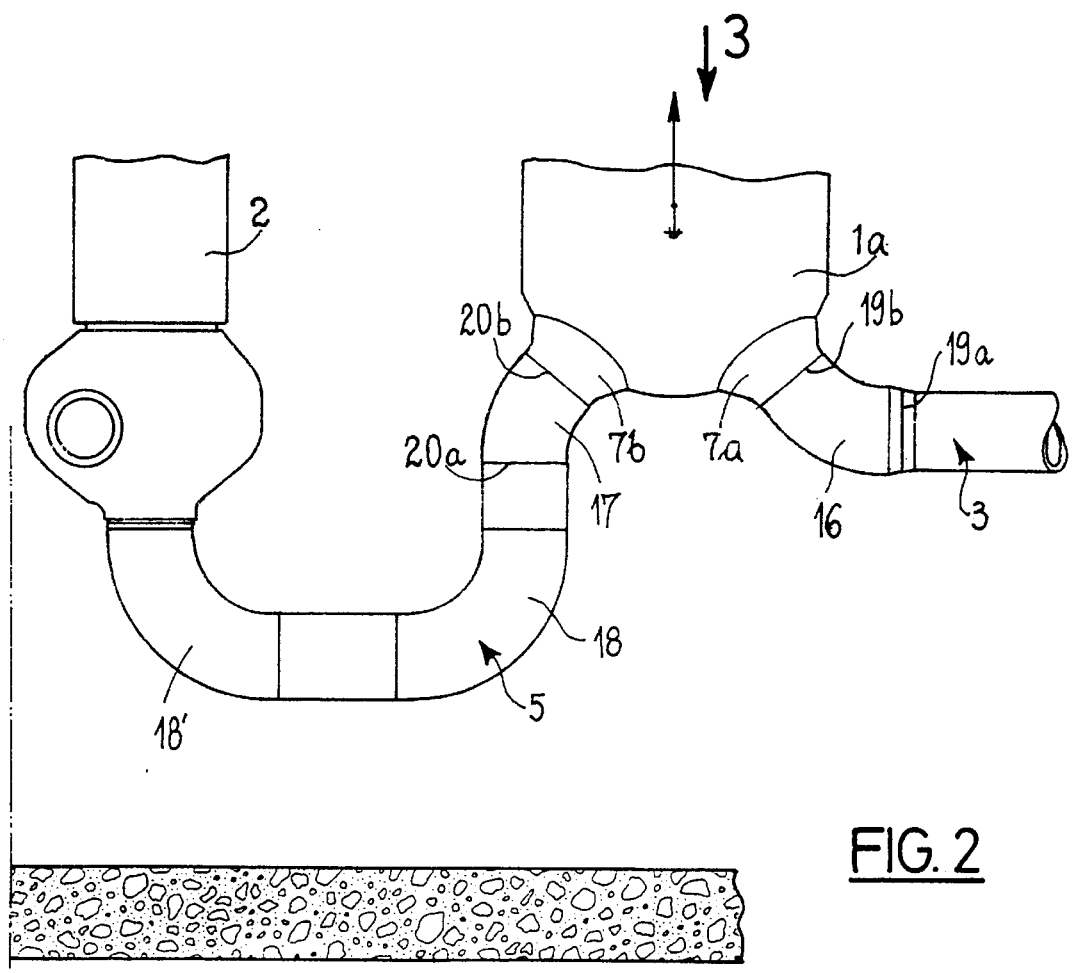
FIG. 2 is an elevational view of the lower part of the steam generator in the directions 2—2 of FIG. 3.
Figure 3:
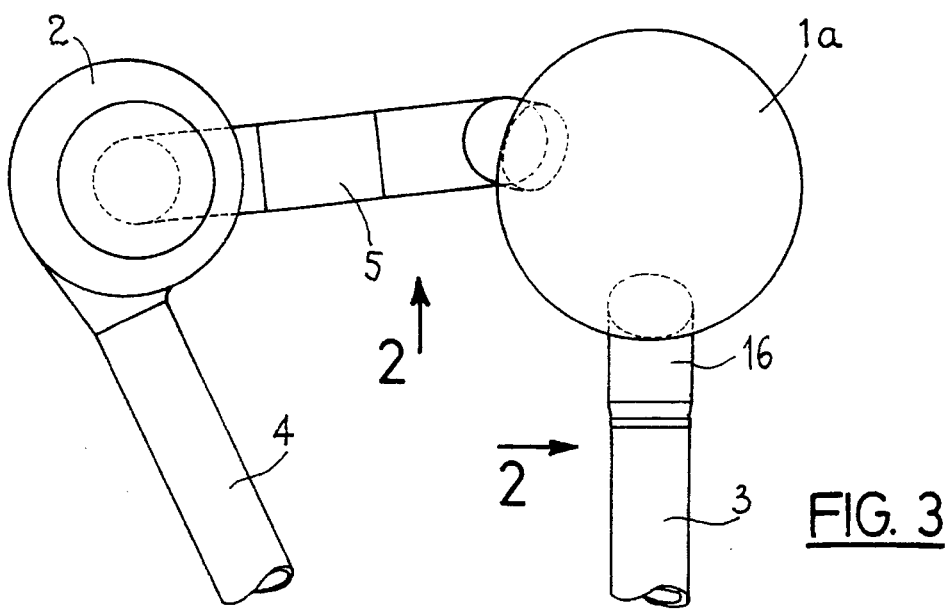
FIG. 3 is a top plan view in the direction of arrow 3 of FIG. 2.

FIGS. 2 and 3 show in more detail the elements connecting the water box 1a of the steam generator and the primary pump 2 to the primary pipes.

The lower part of the shell of the steam generator comprises at the level of the water box 1a, two nozzles 7a and 7b which are unitary with, or connected and welded to the bottom of the steam generator or connected and welded to the bottom and are made when forming the lower part of the steam generator.

The nozzles 7a and 7b open into the water box 1a, nozzle 7a a first compartment or inlet compartment, and nozzle 7b into a second compartment or outlet compartment.

The hot leg 3 of the primary circuit is connected to the inlet compartment of the water box through nozzle 7a and an elbow 16 which is butt welded at one of its ends to the end of the hot leg 3 and at its other end to the nozzle 7a.

The U-leg 5 is connected to the second nozzle 7b of the steam generator through an elbow 17 which is butt welded at one of its ends to the end of the U-leg 5 and at its other end to the nozzle 7b.

The U-leg 5 comprises two other elbows 18 and 18' connected to the short straight parts of the U-leg 5.

The elbow 16 for connection of the hot leg 3 to the first nozzle 7a of the steam generator has an angular extent of 50°, its respective planes 19a and 19b of connection to the hot leg 3 and to the first nozzle 7a forming therebetween a dihedral angle of 50°.

The elbow 17 has an angular extent of 40°, the respective planes 20a and 20b of connection to the U-leg 5 and to the second nozzle 7b forming therebetween a dihedral angle of 40°.

The elbows 18 and 18' have an angular extent of 90°.

Further, as shown in FIG. 3, the axes of the hot leg 3 and the U-leg 5 are contained in vertical planes forming therebetween an angle of a little less than 90°.

The elbow 16 has for its plane of symmetry the vertical plane containing the axis of the hot leg, while the elbow 17 forms and angle with the axial plane of symmetry of the leg 5.

To replace the steam generator 1, it is necessary to cut off or sever the primary pipes 3 and 5 connected to the bottom of the steam generator.

Depending on the operating conditions of the replacement of the steam generator, it may be necessary to make two, three or four cuts of the legs of the primary circuit.

In the case of the process disclosed in FR-A-2,614,462, the replacement may be effected by making solely two cuts in the vicinity of the planes 19b and 20b of connection of the legs 3 and 5 to the bottom of the steam generator.

After machining of the ends awaiting reconnection of the legs 3 and 5, the nozzles of the new replacement steam generator are welded to the ends of the primary pipes 3 and 5 in the vicinity of the connection planes 19b and 20b.

In the event that at least one of the elbows 16 and 17 must be replaced, this replacement can only be effected by making two cuts on the corresponding pipe on each side of the elbow. It is also necessary to effect two joint welds on each side of the new replacement elbow after it has been placed in position between the end of the primary pipe and the nozzle of the steam generator.

The welds are therefore effected in planes having inclinations from the vertical, for example at an angle of 40° or 50° (the case of planes 19b and 20b) or horizontal (plane 20a), or vertical (plane 19a). Certain difficulties might be encountered in carrying out of the welding and in the obtaining welded joints of good quality.

Generally, a connection process involving three or four cuts with replacement of one or two elbows is long and difficult to carry out. It may result in an increase in the duration and cost of the steam generator replacement operations.

Figure 4:
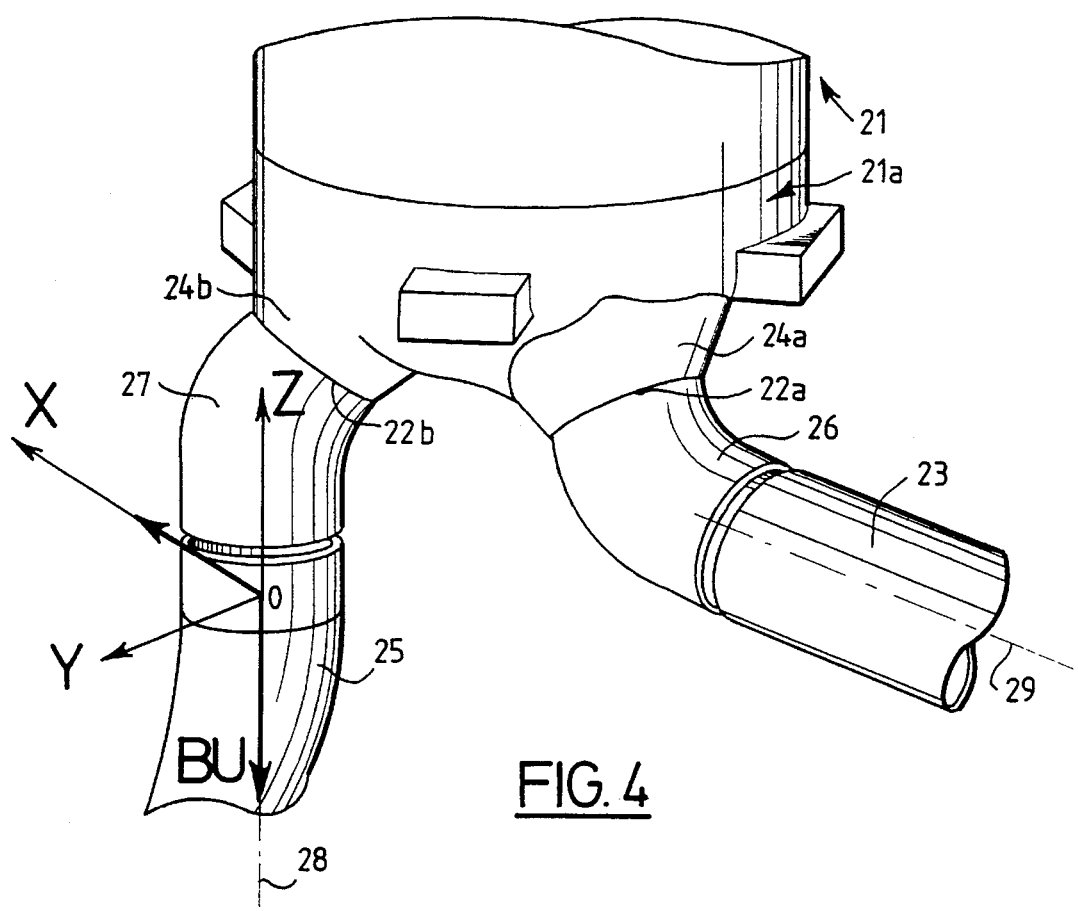
FIG. 4 is a perspective view of the lower part of a replacement steam generator in position for connection to the pipes of the primary circuit of a nuclear reactor when carrying out a first embodiment of the process according to the invention.

Shown in FIG. 4 is the lower part 21a of a new replacement steam generator 21 in the course of a stage of a process for replacing a worn steam generator in accordance with the invention.

FIG. 4 shows the lower part 21a of a new replacement steam generator 21 in its position for connection to the hot leg 23 and to the U-leg 25 of a loop of the primary circuit of a pressurized water nuclear reactor on which is being carried out a steam generator replacement operation.

Prior to placing the replacement steam generator 21 in its position for connection shown in FIG. 4, the worn steam generator to be replaced by the new steam generator 21 was disassembled in the manner described in FR-A-2,614,462.

In the case of the process disclosed in said FR-A-2,614,462, the hot leg and the U-leg of the primary circuit are cut or severed in the vicinity of the ends of the connection of the nozzles of the water box of the steam generator to the end parts of the elbows through which the pipes of the primary circuit are connected to the lower part of the steam generator.

The new replacement steam generator in the process disclosed in FR-A-2,614,462 is placed in the steam generator compartment after removal of the worn steam generator in such manner that the end of the nozzles of its lower part are opposite the ends of the elbows in the region of which the cut was made.

Before the replacement steam generator is placed in the compartment, topometric measurements are made in order to determine in a very precise manner the position of the bevelled connection nozzles.

Preferably, the primary pipes are cut in accordance with a two stage process, the first stage consisting in cutting the pipe by the use of an orbital machining tool with removal of cuttings of conventional type from the exterior of the pipe until there remains only a thickness of metal (of 1 to 2 mm) constituting the residual part of the wall of the pipe.

The cutting operation with removal of cuttings is then interrupted and the machined region is cleaned.

The second stage employs a wheel which upsets the metal without producing cuttings for detaching the remaining part of the primary pipe thus precluding the introduction of cuttings or filings inside the primary circuit.

After the cuts are made and the worn steam generator is removed from the compartment, the topometric operations are carried out for precisely defining the position of the ends of the primary piping.

By comparing the results of the topometric measurements carried out on the new replacement steam generator and on the connection ends of the primary pipes of the worn steam generator, it is possible to determine the position of the bevels of the primary pipes for achieving an optimal connection of the new generator.

The ends of the legs of the primary circuit formed by the ends of the elbows which had been cut are then machined to produce bevels which are complementary to the bevels at the ends of the nozzles of the replacement steam generator in which the weld beads are to be deposited.

In the case of the process according to the embodiment prior to introduction of the replacement steam generator 21 into the compartment in the position of connection to the primary pipes 23 and 25, elbows 26 and 27 are welded to the nozzles 24a and 24b.

These prior operations are carried out in the workshop, the replacement steam generator 21 being disposed with its axis horizontal on a generator-turning machine having a horizontal turning axis.

The turning machine permits the steam generator 21 to be placed in two successive positions for forming the respective welded joints 22a and 22b for connecting the nozzles 24a and 24b to the elbows 26 and 27 in a perfectly vertical position. This makes it possible to produce welded join the elbows 26 and 27 under very good conditions, so that welds of very high quality are obtained.

The steam generator 21 equipped with the elbows 26 and 27 is conveyed to the site of the nuclear reactor where the steam generator must be replaced.

The various handling and transporting operations carried out on the steam generator 21 do not present any particular difficulty, inasmuch as the overall diametrical size of the lower part of the steam generator including the elbows 26 and 27 remains slightly smaller than the overall diametrical size of the upper part of the steam generator.

The operations for handling the steam generator 21 on the site of the nuclear reactor for introducing it into the shielded compartment of the reactor from which the worn steam generator has been withdrawn present no particular difficulty if an adapted handling tooling is developed; however, the introduction and the positioning in the shielded compartment of the steam generator equipped with the elbows 26 and 27 may require the disassembly of certain superstructures inside the shielded compartment.

The general process for replacing the steam generator is similar to the process disclosed in FR-A-2,614,462. Topometric measurements are carried out in the workshop on the replacement steam generator provided with its elbows 26 and 27 for determining in a very precise manner the positions of the planes defining the end parts of the elbows 26 and 27 to be connected to the primary pipes 23 and 25 awaiting reconnection in the shielded compartment of the steam generator.

In order to compensate for the shrinkage of the metal when butt welding the elbows 26 and 27 to the nozzles 23 and 25, the elbows 26 and 27 are so designed and machined as to have an extra length in the axial direction of their connection end part relative to their nominal dimensions.

In the case of operations for replacing a steam generator of pressurized water nuclear reactors at present in operation, extra lengths on the order of 9.5 mm were provided on the connection elbows 26 and 27.

Further, in order to permit placing the lower part 21a of the steam generator in position in the shielded compartment in such a manner that the end parts of the elbows come into alignment with the end parts of the primary pipes 23 and 25 which await reconnection and have been machined, at least one of the primary pipes must be slightly displaced in order to obtain a sufficient mounting clearance e. The clearance e required for placing in position and mounting the steam generator is generally on the order of a few millimeters.

In the case of a steam generator equipped in the workshop with two elbows 26 and 27 to be connected to the primary pipes 23 and 25 awaiting reconnection, it is not possible to displace the pipe 23 along its horizontal axis 29 since the pipe is completely rigid in this direction.

The extra length of the elbow 26 is consequently compensated for by displacing the steam generator parallel to the axis 29 through a corresponding distance, i.e. a distance on the order of 9.5 mm. The mounting clearance is obtained in the same operation.

In order to compensate for the displacement of the steam generator through 9.5 mm in the direction parallel to the axis 29 relative to the pipe 25, this pipe 25 must be displaced along a horizontal axis X parallel to the axis 29 through a distance equal to 9.5 mm. Further, in order to obtain a sufficient mounting clearance e along the vertical axis 28 of the end part of the pipe 25 and of the elbow 27, and in order to compensate for the extra length of 9.5 mm of the elbow 27, the free end of the pipe 25 constituting the U-leg of the steam generator must be displaced along a vertical axis Z coincident with the vertical axis 28 of the pipe 25 and of the elbow 27. In taking as a reference a trirectangular trihedron having axes 0X, 0Y and 0Z, the axes X and Z having been defined hereinbefore and the axis Y being the axis perpendicular to X and Z, the coordinates of the vector of the displacement of the end of the pipe 25 along the axes X, Y and Z have for magnitudes (9.5 mm, 0, and $-(9.5+e)$mm).

No displacement of the leg 23 is necessary.

The displacements of the end of the pipe 25 are obtained very precisely by clamping and exerting traction on the end part of the U-leg in the required directions.

The replacement steam generator 21 can consequently be placed in position, the end of the pipe 25 being temporarily maintained in its slightly displaced position.

The end part of the elbow 26 is then brought into abutment with or butt joined to the end of the pipe 23, and the traction force exerted on the end part of the pipe 25 is then released so as to bring this end part into abutment with the end part of the elbow 27.

The elbows 26 and 27 can then be welded to the end parts of the pipes 23 and 25 by a TIG orbital welding process.

The topometric measurements carried out in the shielded compartment of the steam generator prior to the cutting of the primary pipes connected to the steam generator to be replaced, the topometric measurements for determining in a very precise manner the position of the connection planes of the primary pipes, and the topometric measurements carried out on the replacement steam generator permit butt joining the replacement steam generator to the pipe end parts in a very sure manner.

Further, the worn steam generator is replaced by making only two cuts on the primary circuit of the steam generator.

The process according to the invention therefore permits simultaneous the replacement of the steam generator and of the primary circuit elbows in a manner similar to the replacement of the steam generator described in FR-A-2, 614,462 in which the elbows are left connected to the ends of the legs of the primary circuit, await reconnection and are subsequently reconnected to the replacement steam generator in the end planes of the nozzles.

The total duration of the operation for replacing the steam generator is substantially identical to the duration of an operation for replacing a steam generator without replacing the elbows for connection to the hot leg and to the U-leg.

Lastly, the connection welds are effected in a horizontal plane and in a vertical plane.

It will be understood that it is possible to replace the steam generator simultaneously with only one of the elbows for connection to the hot leg or the U-leg.

Figure 5:
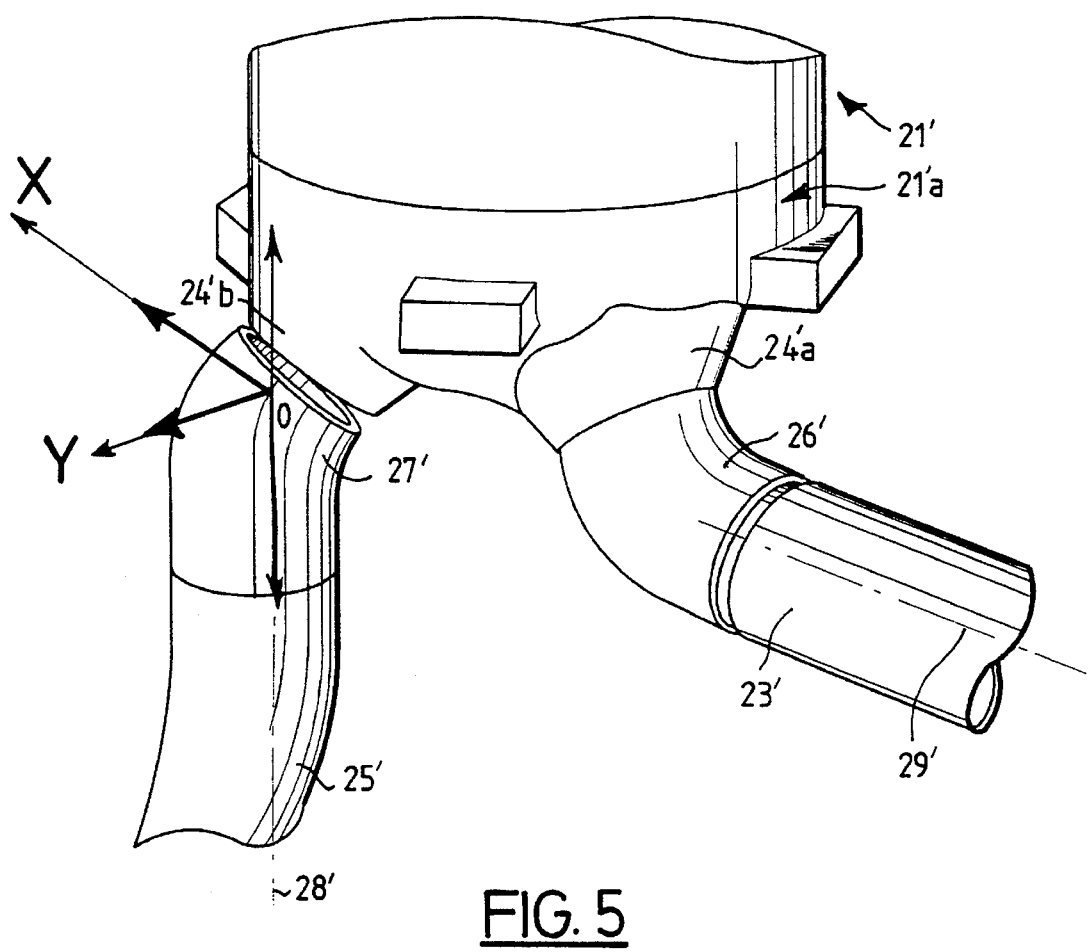
FIG. 5 is a perspective view of the lower part of a replacement steam generator in position for connection to the pipes of the primary circuit of a nuclear reactor when carrying a second embodiment of the process according to the invention.
Figure 6:
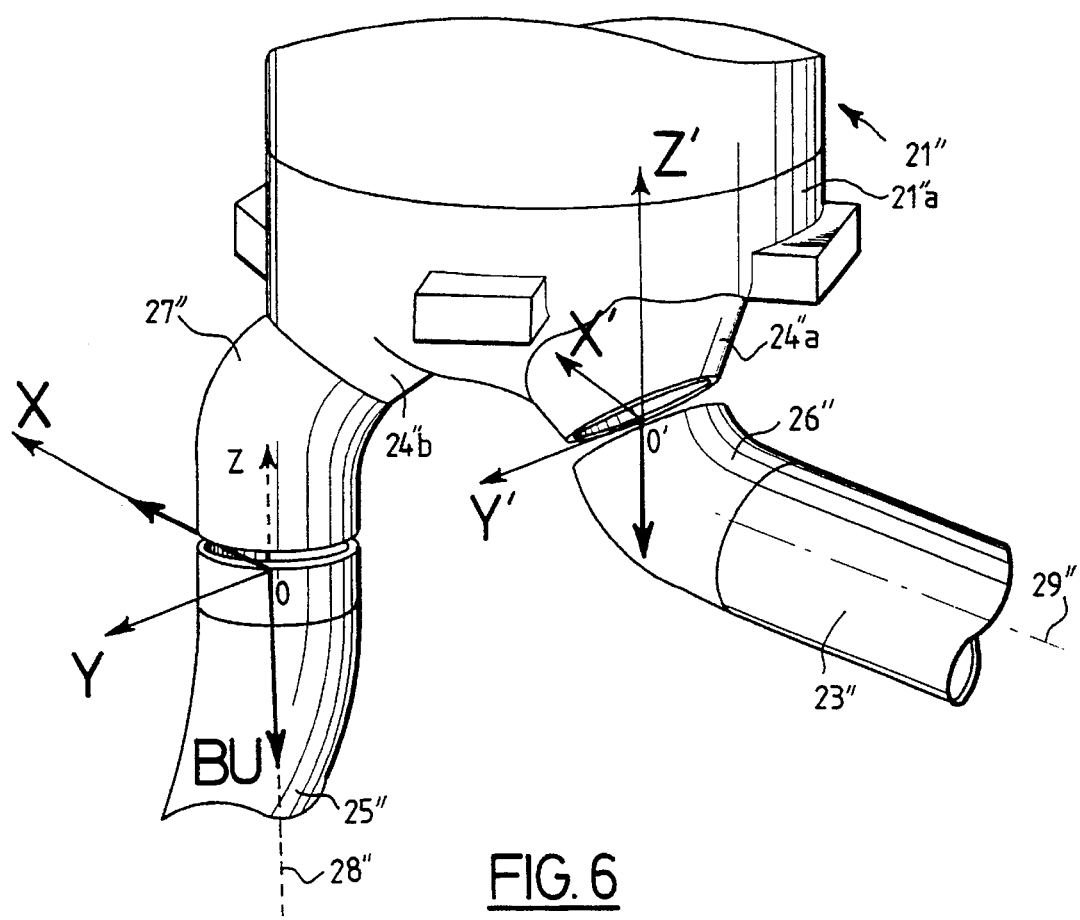

FIGS. 5 and 6 in a manner similar to FIG. 4, the lower part of a replacement steam generator which is butt joined to or brought into abutment with the end parts of the hot leg and the U-leg of a primary circuit loop of a steam generator after removal of a worn steam generator.

Corresponding elements carry the same reference numerals in FIGS. 4, 5 and 6. However, the elements of the steam generator and of the primary circuit shown in FIG. 5 are provided with the sign ' (prime) and the elements of the replacement steam generator and of the primary circuit shown in FIG. 6 are provided with the sign " (double prime).

The replacement steam generator 21' shown in FIG. 5 comprises an elbow 26' for connection to the hot leg, this elbow having been welded in the workshop to the lower part 21'a of the steam generator in the same manner as that previously described with respect to the replacement generator 21 shown in FIG. 4.

On the other hand, the elbow 27' for connection to the U-leg is not replaced, so that the second connection surface of the lower part 21'a of the steam generator 21' is constituted by the end of the nozzle 24'b.

Prior to introducing and positioning the replacement generator 21' in the shielded compartment, the worn steam generator connected to the loop of the primary circuit is removed.

This removal is carried out after cutting the hot leg at the end of an elbow similar to the elbow 26', thereby providing the connection of a first nozzle of the worn steam generator to the end of the right part of the hot leg, and cutting in the region of a connection zone between the end part of the second nozzle of the steam generator and the end part of the elbow 27' fixed to the end of the U-leg 25'.

The comparison of the topometric measurements carried out in the workshop on the new steam generator 21' and on the primary circuit of the worn steam generator permits defining the precise position of the two cuts to be made on the hot leg 23' and the U-leg 25'.

In a general way, the operations for replacing a steam generator having a single elbow for connection to the hot leg, as shown in FIG. 5, are identical to the operations for replacing a steam generator having two elbows for connection to the hot leg and the U-leg, respectively, as shown in FIG. 4.

However, the displacements effected by clamping of the primary pipes 23' and 25' for taking into account the welding shrinkage and the required mounting clearance are different from the displacements in the case of a replacement of two elbows, as described hereinbefore.

As in the case of the replacement illustrated in FIG. 4, it is not possible, in the case of the replacement of a steam generator such as that illustrated in FIG. 5, to displace the hot leg 23' along its horizontal axis 29', since the hot leg cannot be deformed by clamping in this direction.

Therefore, in order to take into account the welding shrinkage on the order of 9.5 mm, it is necessary to displace the steam generator 21' relative to its final position through a distance of 9.5 mm along the axis 29' toward the U-leg 25'.

Consequently it is also necessary to displace the end of the U-leg 25' constituted by the end of the elbow 27' through 9.5 mm along the axis X parallel to the axis 29' of the pipe 23'.

Further, owing to the fact that the connection plane between the elbow 27' and the nozzle 24'b forms an angle of 40° with the horizontal plane, the compensation for the welding shrinkage between the elbow 27' and the nozzle 24'b requires a displacement of the end of the elbow 27' through 1.78 mm in the direction X.

The total displacement in the direction X of the end of the elbow 27' is therefore 11.28 mm.

Further, in order to take into account the welding shrinkage between the elbow 27' and the nozzle 24' and in order to obtain a sufficient mounting clearance e (a few millimeters), the end of the elbow 27' must also be displaced a distance equal to (5.84+0.29 e) mm along the axis Y perpendicular to the axis X and to the axis Z disposed on the vertical axis 28' of the U-leg. This displacement along the axis Y is obtained by projection, by taking into account the angle of the connection plane relative to the horizontal (inclination of 40°).

In order to take into account the welding shrinkage and the required clearance e, it is also necessary to displace through a distance −(7.28+0.76 e) the end of the elbow 27' in the direction Z, this distance being determined by taking into account the welding shrinkage of 9.5 mm and the angle of the connection surface with respect to the vertical.

The clamping or deformation of the U-leg is therefore effected in a very precise manner so as to displace its end part constituted by the end of the elbow 27'; the vector of the displacement of the U-leg has for coordinates on the axes X, Y, Z, respectively 11.28; 5.84+and −(7.28+0.76 e).

In the case of a replacement of a steam generator simultaneously with the replacement of a single elbow of this steam generator, it is therefore possible to achieve the replacement with only two cuts on the primary circuit within a period of time substantially equivalent to that required for the replacement of a steam generator alone.

FIG. 6 shows the lower part 21"*a* of a replacement steam generator 21" to which was fixed in the workshop the elbow 27" for connection to the U-leg 25".

The various operations effecting topometric measurements, cutting and removing the worn steam generator and positioning of the replacement generator 21" are carried out in a manner similar to the operations employed in the case of the replacement steam generators illustrated in FIGS. 4 and 5.

However, when butt joining, such as shown in FIG. 6, the hot leg 23" and the U-leg 25" must be displaced by clamping in directions depending on the position and the inclination of the connection planes, on the one hand, between the first nozzle 24"*a* of the steam generator and the elbow 26" of the hot leg 23" and, on the other hand, between the elbow 27" and the horizontal end part of the U-leg 25".

In order to take into account the welding shrinkage on the order of 9.5 mm, it is first of all necessary to displace downwardly through a distance 7.28 mm the end of the hot leg 23", the connection plane between the first nozzle 24"*a* and the end of the elbow 26" making an angle of 50° with the vertical plane.

Further, the steam generator must be displaced parallel to the axis 29" of the hot leg 23" through a distance which takes into account the welding shrinkage of 9.5 mm and the inclination of the connection plane between the nozzle 24"*a* and the elbow 26" relative to the horizontal. It is thus necessary to displace the steam generator 6.1 mm in the direction parallel to the axis 29" so that it is also necessary to displace the end of the U-leg 25" in the direction of the axis X parallel to the axis 29" a distance 6.1 mm.

Moreover, in order to take into account the welding shrinkage of 9.5 mm and the required mounting clearance e (a few millimeters), a displacement is effected in the direction Z of the end of the U-leg 25" through a distance −(9.5+e) mm.

In the references OXYZ and O'X'Y'Z', the vectors of the displacement of the ends of the U-leg 25" and the hot leg 23", respectively have for coordinates: (6.1 mm; 0; −(9.5+e) mm) and (0; 0; −7.28 mm). The reference OXYZ is defined with respect to the direction X parallel to the axis 29" of the hot leg, to the vertical axis 28" of the U-leg and to an axis Y perpendicular to both X and Z.

The reference O'X'Y'Z' is defined with respect to the direction of the axis X' parallel to the axis 29" of the hot leg, to the vertical O'Z' and to the axis Y' perpendicular to the axes X' and Z'.

In the case of the replacement of a steam generator provided with one or two elbows, it is consequently always possible to replace the steam generator by making only two cuts on the loop of the primary circuit.

However, to simultaneously replace the steam generator and the elbow at 90° of the U-leg, such as the elbow 18 shown in FIG. 3, at least three cuts must be made.

For example, in the case of a replacement of the elbows 16, 17 and 18 (FIG. 2), it is possible to make three cuts in the primary circuit in the region of the joints 19*a* and 20*b* and at the lower end of the elbow 18. The replacement of the steam generator can be effected simultaneously with the replacement of the elbows 16 and 17, it being possible to preassemble and simultaneously replace the elbow 18 and the right part of the connection pipe.

In all cases, the use of the process according to the invention, in which the welding of at least one elbow to the lower part of the steam generator is effected in the workshop, reduces the time required and guarantees a very high welding performance.

In the processes of the prior art, it may be necessary to employ a jig or fixture reproducing the lower part of the replacement steam generator which is placed in position in the compartment of the worn steam generator after removal of the latter for checking the possibility of employing the replacement process. In the case of the process according to the invention, it is unnecessary to employ such a jig, since the butt joining and fitting procedures for the pipes of the primary circuit always achieve a mounting of the replacement steam generator comprising at least one connection elbow.

The process according to the invention can be employed for replacing the elbows fixed to the steam generator simultaneously or non-simultaneously with the replacement of an elbow at 90° of the U-leg.

The operations for effecting the topometric measurements, cutting and welding on the primary circuit and on the steam generator may be carried out by means other than those described.

The process according to the invention may be applied simultaneously or in succession for replacing a plurality of steam generators in a plurality of loops of the primary circuit of a pressurized water nuclear reactor.

The invention is applicable to nuclear reactors cooled with pressurized water irrespective of the number of loops of these nuclear reactors.

What is claimed is:

1. Process for replacing a worn steam generator of a pressurized water nuclear reactor which comprises a reactor building defining a compartment in which said steam generator is mounted, and a primary circuit for cooling said reactor with pressurized water and comprising two pipes each connected to a lower part of said steam generator by means of a nozzle fixed to said lower part of said steam generator and an elbow welded at one of the ends thereof to said nozzle and at the other end thereof to the respective pipe, said process comprising the steps of separating said worn steam generator from said primary circuit by cutting said pipes of said primary circuit, extracting said worn steam generator from said compartment, taking a new replacement generator having two nozzles in a lower part of said replacement steam generator, welding, prior to introducing and positioning said replacement steam generator in said compartment, to at least one of said nozzles of said lower part of said replacement steam generator at least one elbow for connection to a respective pipe of said primary circuit, introducing and positioning in said compartment said replacement steam generator together with said at least one elbow welded thereto, and completing the connection of said lower part of said replacement steam generator to said pipes of said primary circuit by welding.

2. Process according to claim 1, comprising welding to each of said nozzles of said lower part of said new replacement steam generator an elbow for connection to a respective pipe of said primary circuit, positioning said replacement steam generator in said compartment so as to butt join free ends of each of said elbows to a respective end part of a respective pipe of said primary circuit which had been cut and is awaiting reconnection, and welding end parts of said elbows to respective end parts of said pipes.

3. Process according to claim 2, comprising, prior to said butt joining, effecting by clamping a displacement of a first of said pipes of said primary circuit constituting a part of a U-leg which provides a connection between said steam generator and a primary pump of said reactor in a direction parallel to the axis of a second of said pipes of said primary circuit constituting a hot leg which provides a connection between said replacement steam generator and the vessel of said nuclear reactor, and in a vertically downward direction.

4. Process according to claim 1, comprising welding a connection elbow to a first of said nozzles for connection of said replacement steam generator to a hot leg of said primary circuit connected to the vessel of said reactor prior to said introduction and positioning of said replacement steam generator in said compartment, thereafter introducing and positioning said replacement steam generator in said compartment and butt joining a free end part of said connection elbow to said hot leg and butt joining a second of said nozzles of said replacement steam generator to an end part of a U-leg of said primary circuit connected to a primary pump of said reactor, and welding said elbow and said second nozzle to said hot leg and to said U-leg, respectively.

5. Process according to claim 4, comprising, prior to the positioning and the butt joining of said connection elbow and said second nozzle of said steam generator to said end parts of said hot leg and said U-leg, respectively, displacing the connection end of said U-leg in a direction parallel to the axis of said hot leg, in a vertically downward direction and in a horizontal direction perpendicular to the direction of the axis of said hot leg.

6. Process according to claim 1, comprising welding to a second of said nozzles of said lower part of said replacement steam generator a connection elbow for connection to a U-leg of said primary circuit of said reactor connected to a primary pump of said reactor prior to introducing and positioning said replacement steam generator in said compartment, and butt joining a first of said nozzles of said lower part of said replacement steam generator to which a connection elbow is not fixed and butt joining said connection elbow to end parts of said two primary pipes, respectively.

7. Process according to claim 6, comprising, prior to said positioning and said butt joining of said replacement steam generator, displacing an end part of a first of said pipes constituting an end of said hot leg for connection of said replacement steam generator to said vessel of said reactor, in a vertically downward direction, and displacing an end part of a second of said pipes constituting an end of a U-leg for connection of said steam generator to a primary pump of said reactor in a direction parallel to the horizontal axis of said hot leg and in a vertically downward direction.

8. Process according to claim 1, comprising effecting the welding of said at least one connection elbow to at least one of said nozzles of said lower part of said replacement steam generator on said new replacement steam generator disposed with the axis thereof horizontal so that the connection zone which is substantially planar obtained by welding said at least one nozzle to said at least one elbow is disposed vertically.

9. Process according to claim 8, comprising disposing said replacement steam generator during the welding of said at least one elbow on a turning machine having a horizontal turning axis.

10. Process according to claim 1, comprising separating said worn steam generator from said primary circuit by effecting two cuts in said pipes of said primary circuit, and connecting said new replacement steam generator to said pipes of said primary circuit in each of two zones of said cuts effected for the separation of said worn steam generator.

11. Process according to claim 10, comprising effecting said cuts in a first stage by an orbital cutting from the exterior of said pipes with removal of cuttings and in a second stage by means of a severing wheel acting without removal of cuttings.

\* \* \* \* \*